(12) United States Patent
Baker et al.

(10) Patent No.: US 11,081,023 B2
(45) Date of Patent: Aug. 3, 2021

(54) RELEASEABLY LOCKING RESETTABLE INJECTION TRAINING DEVICE

(71) Applicant: NOBLE INTERNATIONAL, INC., Orlando, FL (US)

(72) Inventors: Jeff Baker, Orlando, FL (US); Shishuang Hou, Ningbo (CN); Tingting Liu, Orlando, FL (US); Alvin Tze Hin Yuen, Fern Park, FL (US)

(73) Assignee: NOBLE INTERNATIONAL, INC., Orlando, FL (US)

( * ) Notice: Subject to any disclaimer, the term of this patent is extended or adjusted under 35 U.S.C. 154(b) by 182 days.

(21) Appl. No.: 16/527,679

(22) Filed: Jul. 31, 2019

(65) Prior Publication Data

US 2020/0043373 A1 Feb. 6, 2020

Related U.S. Application Data

(60) Provisional application No. 62/712,715, filed on Jul. 31, 2018.

(51) Int. Cl.
*G09B 23/28* (2006.01)
*G09B 9/00* (2006.01)

(52) U.S. Cl.
CPC ............. *G09B 23/285* (2013.01); *G09B 9/00* (2013.01)

(58) Field of Classification Search
CPC .... G09B 23/28; G09B 23/281; G09B 23/283; G09B 23/285; G09B 23/286; G09B 23/288; G09B 9/00
See application file for complete search history.

(56) References Cited

U.S. PATENT DOCUMENTS

| | | | |
|---|---|---|---|
| 2012/0015336 A1* | 1/2012 | Mach | A61M 5/20 434/262 |
| 2013/0236872 A1* | 9/2013 | Laurusonis | G09B 23/285 434/262 |
| 2013/0266919 A1* | 10/2013 | Baker | G09B 23/285 434/262 |
| 2016/0335920 A1* | 11/2016 | Bendek | G09B 23/285 |
| 2019/0266921 A1* | 8/2019 | Chang | G09B 23/285 |

OTHER PUBLICATIONS

Nemera, "Safe'n'Sound", https://www.nemera.net/wp-content/uploads/2014/06/Safe-N-Sound-flyer_Sept2014.pdf, 3 pages.

* cited by examiner

*Primary Examiner* — Timothy A Musselman
(74) *Attorney, Agent, or Firm* — Timothy H. Van Dyke; Wolter Van Dyke Davis, PLLC

(57) ABSTRACT

A resettable injection training device embodiment is provided. In one embodiment, the device may include an outer housing comprising locking tabs at its proximal end, a safety shield, the safety shield being slidable relative to the outer housing between a ready-to-fire position, and a fired position, wherein when the safety shield is in a fired position, the injection simulation member is retracted into the outer housing. The device may further include a plunger comprising a proximal end and a distal end, the proximal end comprising a plunger contact portion for interfacing with the locking tabs to displace the locking tabs to unlock the safety shield, and a biasing member disposed between the outer housing and the safety shield to extend the shield in a proximal direction upon release of the locking tabs, wherein retraction of the plunger and proximal movement of the outer housing resets the device.

16 Claims, 7 Drawing Sheets

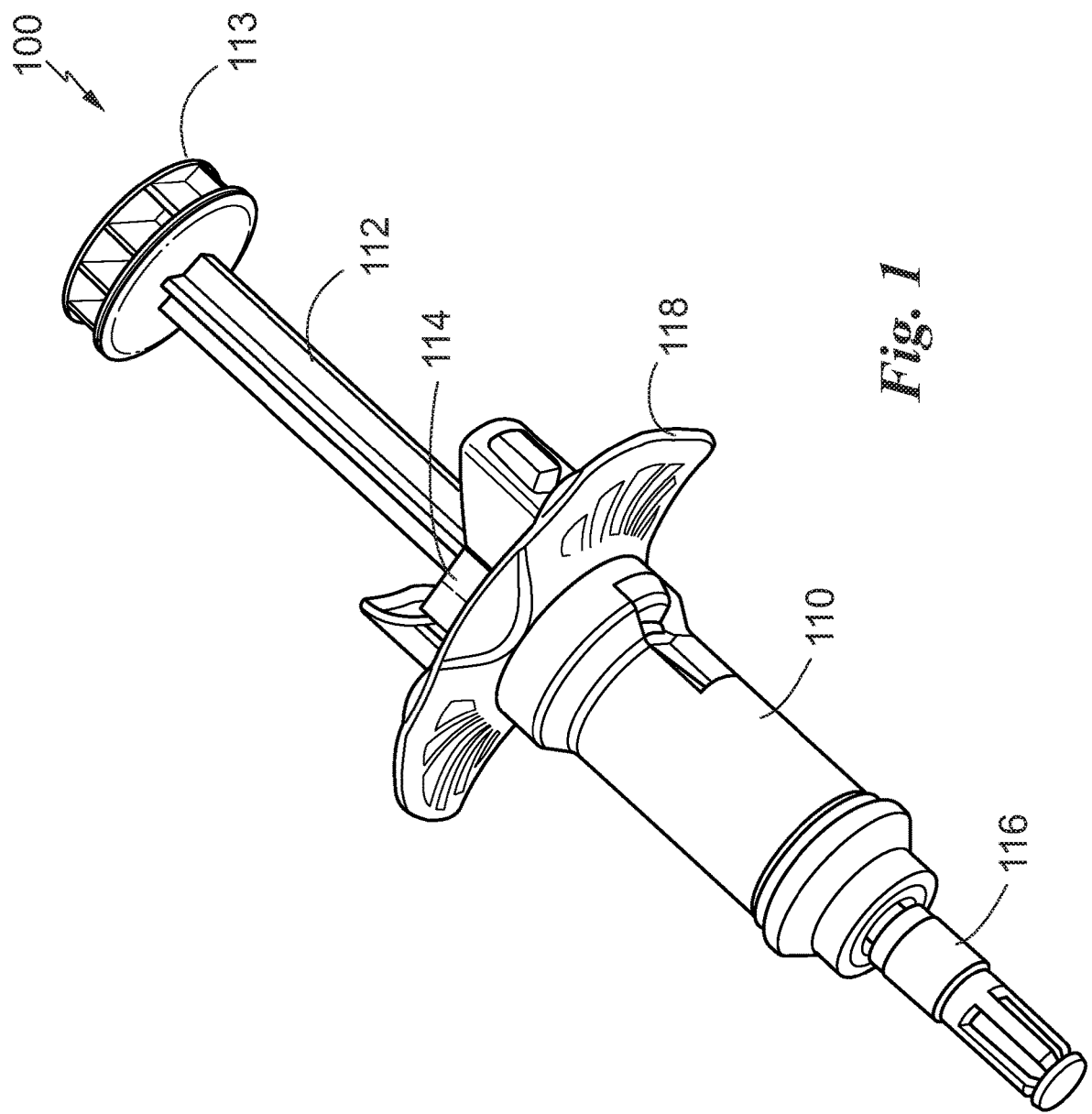

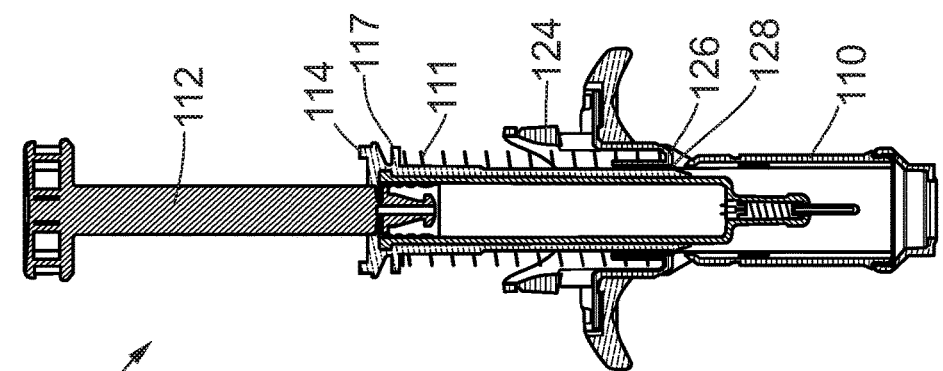
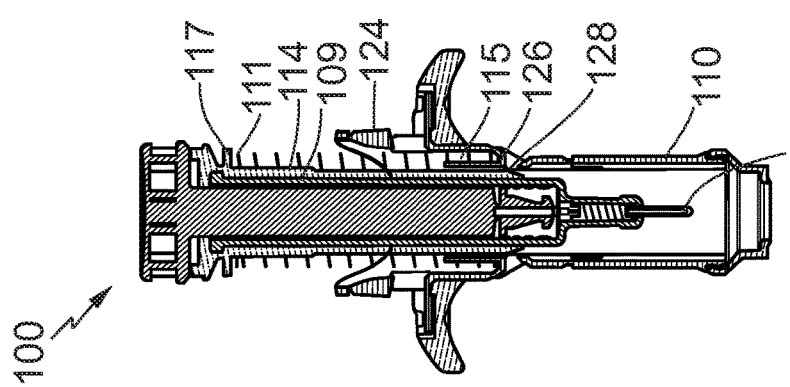
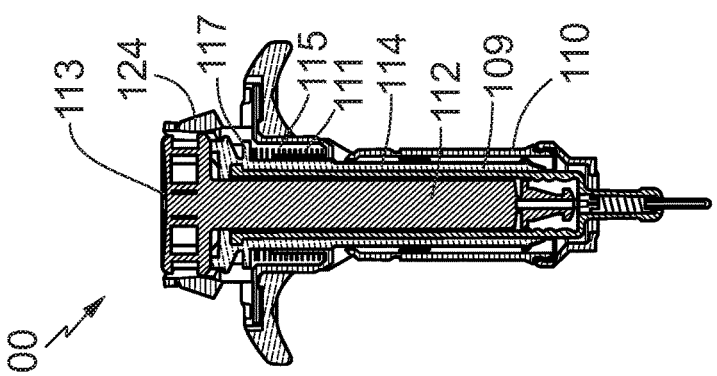
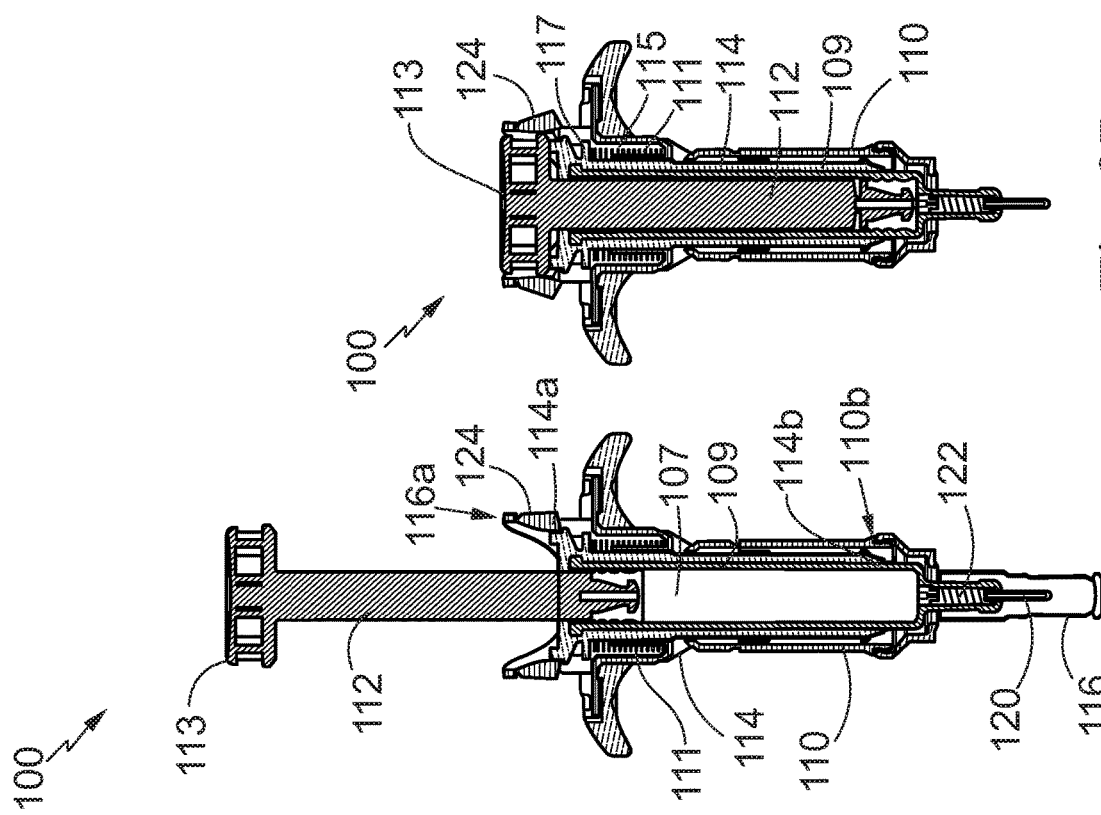

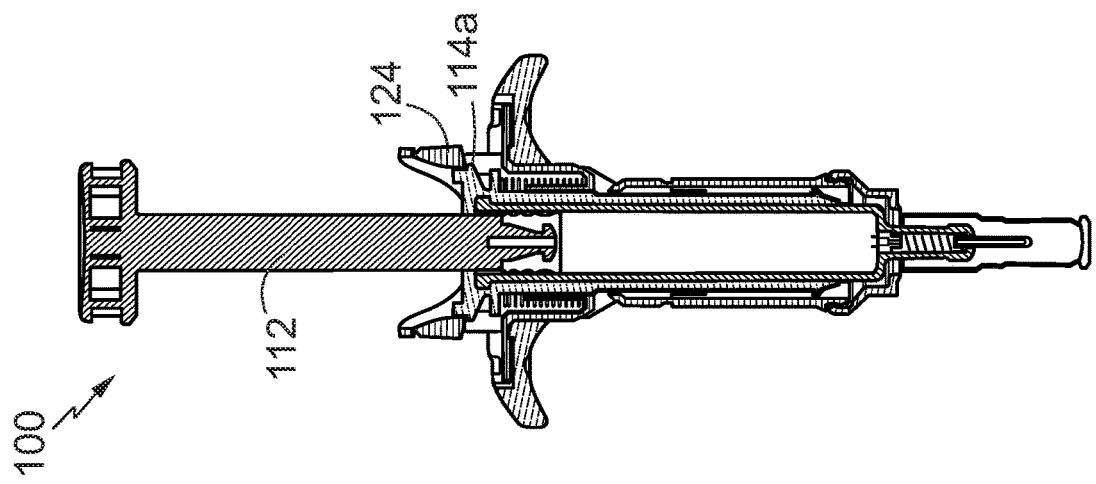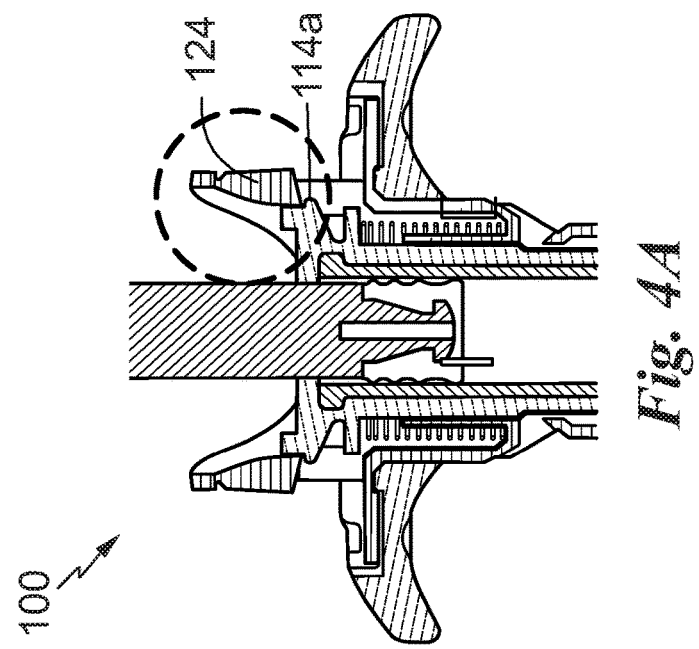
Fig. 4A
Fig. 4B

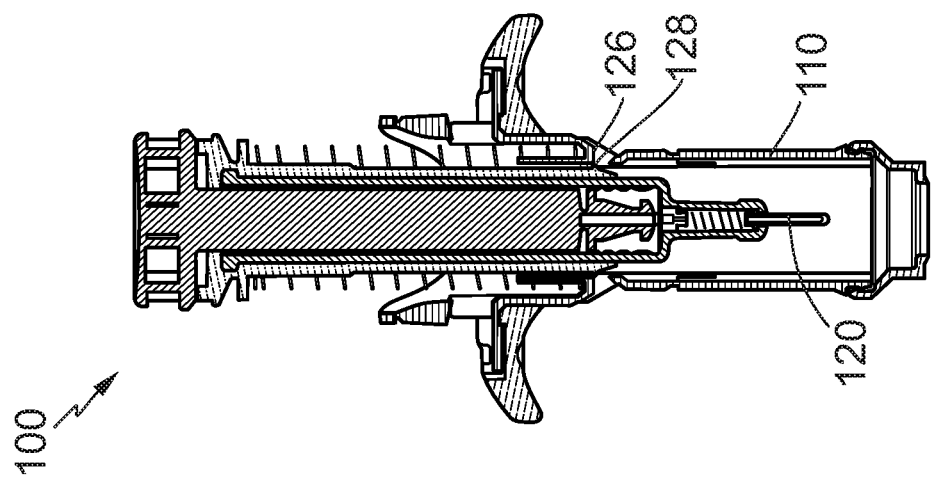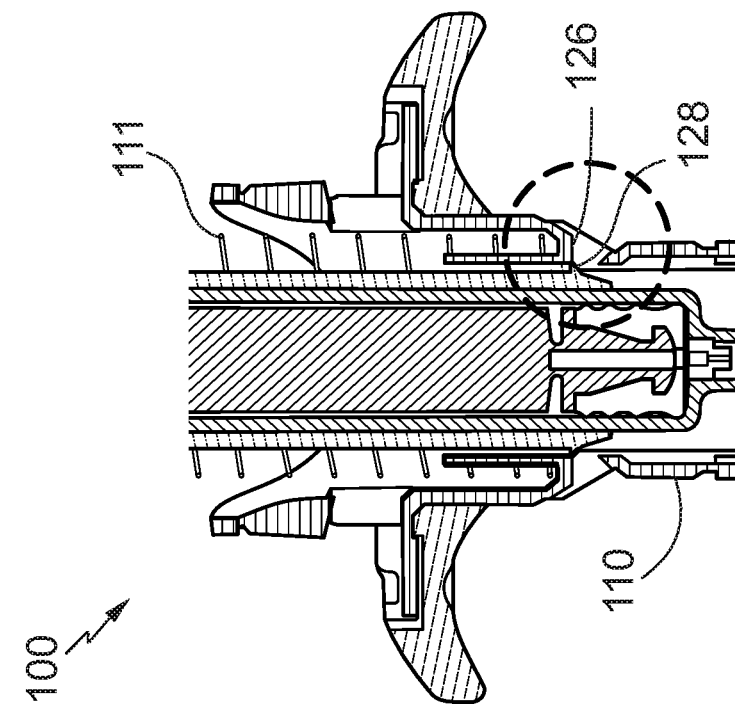

RELEASEABLY LOCKING RESETTABLE INJECTION TRAINING DEVICE

CROSS REFERENCE TO RELATED APPLICATIONS

This application claims priority to U.S. Provisional Application No. 62/712,715 filed Jul. 31, 2018 under 35 USC 120. The entirety of this application is incorporated by reference herein.

BACKGROUND

Injection devices have recently become increasingly popular for single dose or multi-dose, at home self-administration. These devices include both auto-injection devices and prefilled syringe devices, and are often designed to accomplish two basic objectives: convenience of drug delivery in an outpatient or at home setting, and/or automation of drug delivery in an outpatient or at-home setting. These devices may be mechanically spring-loaded devices that advance a plunger or rubber stopper to transfer medication via hollow-bore needle to a patient's tissues, in some examples. These devices lack the ability to regulate whether the medication is actually delivered to the patient or whether it is delivered to a correct location. Most of these devices fail to integrate advanced digital capabilities.

Injectable medications are required for a number of varying illnesses and diseases. A number of injectable medications require self-injection by a patient. Self-injection of a medicament using a device having a needle carries with it a certain stigma. Oftentimes patients are weary of injecting themselves for fear or anxiety related to failing to receive a complete dose of the medication, pain associated with injecting oneself with the needle, accidentally sticking oneself with the needle, and difficulties in adequately grasping the dosing mechanism to inject oneself, among other concerns. These fears and anxieties associated with the currently available self-injection devices may result in the administration of an incomplete dose of a medicament, failure to administer any portion of the dose of a medicament, or accidentally sticking oneself with the needle of the device, which in some instances could lead to unwanted transmission of diseases if the needle is contaminated.

An additional concern exists with regard to injection devices is that users with little or no medical knowledge or experience are injecting themselves or injecting others using these devices. Performing a medical treatment or test on oneself or others carries with it certain risks and often creates a level of anxiety for the user performing the treatment or test. It has proven beneficial in the medical field to practice various medical techniques including drug delivery, specifically where it relates to injections and other invasive drug delivery means prior to delivering the medications to a patient in need, and particularly in the case of self-administration of medicaments. Training devices are helpful in reducing anxiety associated with self-administering medical treatment, as well as increasing efficiency and accuracy in providing the treatment to patients. Medical devices can be intimidating to use; the fear associated with giving oneself an injection, for example, can be traumatic. This fear is increased in persons with little or no experience in self-administration of medications. Consequently, devices to assist in training individuals to inject themselves or otherwise self-administer medication are beneficial in decreasing or preventing the anxiety associated with medicament delivery. In many cases, unfamiliarity with the way in which a particular injection device functions is the cause of concern an anxiety in users, and oftentimes the cause of mistakes when using the device.

Safe use and re-use of these training devices requires resetting of the devices by way of a mechanism that provides the movement of the device to initiate the injection, and in some instances, the portion of the device that protects users from sticking themselves. Therefore, a device which allows repeated practice and use to enhance familiarity with the injection device and the self-injection process, along with the ability to safely and efficiently reset the device is paramount to an effective device for injection training.

SUMMARY

In one embodiment, a resettable injection training device is provided. The device may include a releasable locking outer housing comprising a proximal end and a distal end, and locking tabs at the proximal end, an inner housing comprising an injection simulation member extending from a distal end thereof, and a slidable releasably locking safety shield having a proximal end and a distal end, the safety shield being slidable relative to the outer housing between a ready-to-fire position, and a fired position, wherein when the safety shield is in a fired position, the injection simulation member is retracted into the outer housing. The device may further include a plunger slidable relative to the inner housing, comprising a proximal end and a distal end, the proximal end comprising a plunger contact portion for interfacing with the locking tabs to displace the locking tabs to unlock the safety shield; and a biasing member disposed between the outer housing and the safety shield, said biasing member extends the shield in a proximal direction upon release of the locking tabs, wherein when the safety shield is in a fired position, retraction of the plunger, followed by proximal movement of the outer housing against the force of the biasing member until the tabs interface with the proximal end of the safety shield locks the safety shield in a ready-to-fire position, and resets the device.

In another embodiment, a method for using a resettable injection training device is provided. The method includes a resettable injection training device embodiment including a plunger, wherein the plunger is in a retracted position, the method including moving the plunger toward a distal end of the device to simulate medicament delivery until a plunger contact portion interfaces with and displaces one or more housing tabs from the proximal end of the safety shield, such that a biasing member causes the safety shield to slide in a proximal direction relative to the outer housing to a fired position, retracting an injection simulation member within the outer housing.

In still another embodiment, a method for resetting a resettable injection training device is provided. The method includes a resettable injection training device embodiment including an outer housing, a plunger, a safety shield, and a biasing member. The method includes when the device is in a fired position, moving the plunger in a proximal direction relative to the outer housing, and moving the outer housing in a proximal direction relative to the safety shield against the force of the biasing member disposed between the outer housing and the safety shield until one or more tabs at the proximal end of the outer housing engage the proximal end of the safety shield to releasably lock the injection training device in a ready-to fire position for a subsequent use.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 1 is a perspective view of an embodiment of the resettable injection training device.

FIGS. 2A-2D are cross sectional views of the resettable injection training device shown in FIG. 1, demonstrating step-by-step use of the device according to one embodiment.

FIGS. 4A-4B is a partial cross-sectional view and a full cross sectional view, respectively, of the device embodiment shown in FIG. 1, in the ready-to-fire position.

FIGS. 6A-6B is a partial cross-sectional view and a full cross-sectional view, respectively, of the device embodiment shown in FIG. 5A-B in a fired position once the safety shield has extended in a proximal direction.

DETAILED DESCRIPTION

Figure 3B:
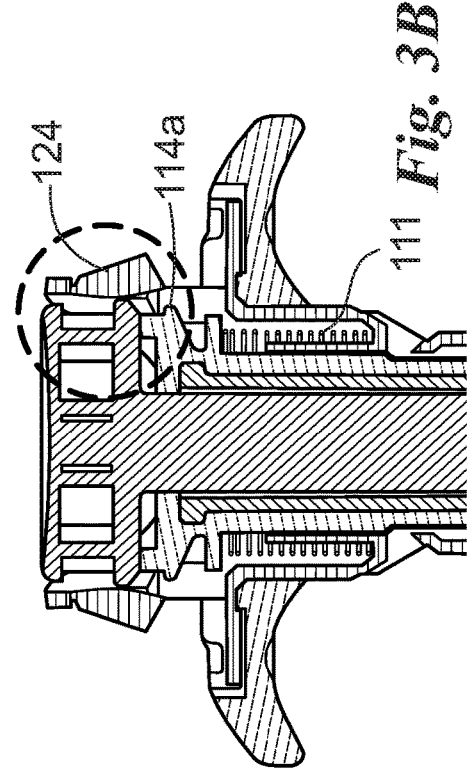
FIGS. 3A-3D are partial cross-sectional views of the resettable injection training device shown in FIG. 1, demonstrating step-by-step use of the device from the ready to fire position, through reset of the device, according to one embodiment.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

As used herein, the singular forms "a," "an," and "the" are intended to include the plural forms as well, unless the context clearly indicates otherwise these terms do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order, quantity or importance, but rather the terms first, second, etc., are used to distinguish one element from another. The modifier "about" used in connection with a quantity is inclusive of the stated value and has the meaning dictated by the context. It is to be noted that all ranges disclosed within this specification are inclusive and are independently combinable.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. As a non-limiting example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 7. As another non-limiting example, a range of "between 20 and 10" can also include the values 20, 10.

The term "adjacent" as used herein, includes but is not limited to near, associated with, or in close proximity to.

Those skilled in the art will understand that the term gauge (G) refers to a gauge of a needle according to gauges known in the art. Typical gauge ranges used in the equation(s) provided herein will include gauges ranging between approximately 18-30.

The resettable injection training device described in embodiments herein may be used to simulate an injection device. The term "injection device," as used herein refers to any device used to deliver medicament by way of parenteral administration. These injections include, but are not limited to intramuscular (IM), intravenous (IV), subcutaneous (SC), inravitreous, intraosseous infusion, intracerebral, intra-arterial, intracerebroventricular, intrathecal, among other injection types. The resettable injection training device may include structural and/or functional features to simulate an auto injector in a non-limiting embodiment, or a prefilled syringe in another non-limiting embodiment, for example. Other injection devices may also be simulated by the injection simulation member embodiments described herein.

The inventors herein have identified a need for a device to be used in effectively training patients to use a needle-containing injection device, particularly when these injection devices are used for at home or outpatient environments. In the field of medicament injection training devices, correct injection of medicament by way of the injection device is crucial for obtaining accurate doses of medicament contained therein. Factors such as a fear of needles, fear of pain associated with an injection, inexperience with injection devices and delivering injections, and unfamiliarity with injection devices and their operation, among other factors can contribute to issues in administering the medicament correctly with the injection device. Consequently, patient training in correct operation of the injection device is crucial to reducing patient anxiety and enhancing patient compliance.

Embodiments of the resettable injection training device may provide tactile, visual, and auditory stimuli to a user, wherein during use of the device, the tactile, visual, gustatory, olfactory, or auditory feedback, or any combination thereof, are synchronized in a manner such that a needle-containing injection delivery device is accurately simulated. The synchronization of the stimuli is a significant factor in facilitating multisensory learning of the user.

The injection simulation member embodiments described herein may include components which provide a tactile/force reflecting mechanism (i.e., resistance mechanism) to provide force feedback to simulate the feel of an injection device used during an injection without traversing the skin of a user. Force feedback is typically accomplished by a tactile/force reflecting mechanism that imparts force to a user of the injection simulation member in response to manipulation of the injection simulation member. The force(s)/resistances that may be generated as a user manipulates the injection simulation member against a surface simulate the forces/resistances encountered during an injection at a target location of a user. Examples of force reflecting mechanisms may include a biasing member associated with the injection simulation member, configured to be energized upon application of a force to the distal end of the injection simulation member to create a resistance against movement of the injection simulation member toward the proximal end of the resettable injection training device. Therefore, the injection simulation member may be retractable relative to the resettable injection training device.

In an embodiment, an injection simulation member is provided to allow for a simulated injection experience during use of the injection simulation member without puncturing the skin of a user. The injection simulation member may include an injection simulation member may include a blunt end probe or other similar object known in the art provided to mimic the sound, look, and/or feel of the injection by an injection member in a training or simulation session allowing a user to train oneself for administering an injection without puncturing the skin of the user. One skilled in the art would realize that the injection simulation member can be made of any materials known in the art to, in some embodiments, provide a flexibility, and tensile modulus to simulate a needle while maintaining the rigidity and stability to provide a simulated sensation of an injection without traversing the skin of a user. The injection simulation member provides a perception to a user of injection into the skin and mimics or simulates an actual injection during retraction of the injection simulation member from an extended position to a retracted position upon application of a force, to simulate an injection without traversing or puncturing the skin of the user.

Multiple forces are encountered during an injection, and these forces are often influenced by one or more variables including needle gauge, needle length, injection angle needle point, needle coating or other surface characteristics, lubrication of needle or injection site, needle depth in patient tissue, type of patient tissue (i.e., skin, muscle), characteristics of patient tissue which may be influenced by age, health, weight, and/or genetically determined variables, among other potential force-influencing variables. The resettable injection training device and/or the injection simulation member may simulate a multi-phase force profile during use of the resettable device. The multi-phase force profile includes a first phase configured to simulate a deformation force, the deformation force simulating the force of pressing a needle against a subject so as to deform at least a first layer of tissue prior to traversing at least the first layer of tissue of the subject, a second phase configured to simulate a puncture, and a third phase configured to simulate an insertion force, wherein the insertion force includes the force required for a needle to traverse the tissue to a target injection location. The injection simulation device may simulate different forces in order to provide a simulated injection event by accurately simulating the forces encountered when using a medicament delivery device having a needle in some embodiments.

The injection simulation member may further or in place of the biasing member, may include a resistance mechanism, wherein the resistance mechanism may provide one or more resistance values (one or more forces) as the injection simulation member is retracted, to simulate one or more forces applied during an injection event. The resistance may increase as the injection simulation member is retracted to simulate a deformation force until at least a first retracted position is reached, wherein upon reaching the first retracted position, the resistance decreases to simulate a puncture rebound force, following the decrease in resistance, the resistance increases as the injection simulation member is retracted to simulate an insertion force until at least a second retracted position is reached, wherein said one or more forces are configured to simulate one or more variables affecting one or more forces during an injection, including needle gauge, needle length, needle bevel, needle coating, needle sharpness, lubrication of the needle, angle of the needle relative to a target site, or one or more characteristics of a tissue traversed by a needle, or a combination thereof.

Upon release of a force on the distal end of the injection simulation member, the injection simulation member may extend to a pre-use position in preparation for a subsequent use.

The biasing member or the resistance mechanism may include a digressive spring, such as a Belleville spring, in a non-limiting embodiment. In some examples, a Belleville spring or other digressive spring may be compressed as the injection simulation member is retracted, and a resistance on the retraction of the injection simulation member may increase until the Belleville spring reaches a threshold compression level. Upon reaching the threshold compression level, the resistance on the injection simulation member may decrease.

In still another embodiment, the resistance mechanism may include a needle component and a needle-traversable material, wherein upon exerting a force on the injection simulation member to retract the injection simulation member from an extended position to a retracted position, the needle component traverses the needle-traversable material to provide a tactile feedback and/or a resistance to simulate the feel of a needle traversing a tissue of a patient. In one particular embodiment, the needle-traversable material may include a pseudo skin material.

In a further embodiment, the resistance mechanism may include a resistance membrane disposed within the housing such that the injection simulation member contacts the resistance membrane as the injection simulation member is retracted from an extended position to a retracted position in response to a force on the injection simulation member. During retraction of the injection simulation member, the movement of the injection simulation member relative to the resistance membrane provides a resistance on the injection simulation member to simulate a deformation force and/or an insertion force of an injection. Upon releasing the force on the injection simulation member, the biasing member may cause the injection simulation member to be extended from a retracted position to an extended position to reset the injection simulation device.

Forces that may be encountered during an injection are simulated in embodiments of the injection simulation member provided herein. As mentioned above, forces that may be encountered during an injection include a deformation force, a puncture rebound force, an insertion force, a relaxation force, and an extraction force or any combination thereof. A deformation force may occur when a needle is pressed onto a surface of a tissue, for example, an outer surface of the epidermal layer of a patient, causing the epidermis to deform under the pressure of the needle prior to puncture of the epidermis by the needle. A puncture rebound force refers to the force that is sensed once the needle traverses the tissue of the subject. It has been discovered that this causes a temporary decrease in force during an injection. An insertion force can be described as the force of the injection after the needle traverses the tissue, and until the needle reaches its target depth in the patient tissue. In some instances, the insertion force is the greatest increase in force over time during the course of an injection. A relaxation force typically follows the insertion force. The relaxation force occurs once the needle has reached its target depth in the patient tissue and the medicament is injected into the target tissue. The relaxation force is marked by a decrease in force that occurs as the medicament is expelled through the needle. An extraction force is one which is felt during removal or retraction of the needle from the tissue and is marked by a greater decrease in force over time than the relaxation force, in some non-limiting instances.

In one embodiment, the injection simulation member may simulate a needle of an injection device with a determined gauge (G) and which device is configured such that the injection simulation member retracts from an extended position to a first retracted position under application of a force. In an embodiment, an injection training device for simulating one or more forces of an injection may include a retractable injection simulation member configured to simulate a needle of an injection device with a determined gauge. The device is configured such that the injection simulation member retracts from an extended position to a retracted position upon application of a force. In one example, this force may include a multi-phase force profile. The multi-phase force profile may include at least a first phase configured to simulate a deformation force, the deformation force simulating the force of pressing a needle against a subject so as to deform at least a first layer of tissue prior to puncturing at least the first layer of tissue of the subject; and at least a second phase configured to simulate a puncture rebound force, in a non-limiting embodiment. In one embodiment, the second phase includes a force that is less than the deformation force.

The device may further include at least a third phase configured to simulate an insertion force, wherein the insertion force includes the force required for a needle to traverse the tissue to a target injection location of the subject. The target injection location includes a location wherein the injection is to occur, such as, muscular tissue, intra-ocular tissue, subcutaneous tissue, adipose tissue, intra or inter peritoneal tissue, inter or intra venous or arterial tissue, among other target locations for injections known to those skilled in the art.

In a further embodiment, the injection simulation member includes one or more additional phases configured to simulate puncturing of composite tissue areas. Composite tissue areas may include multiple layers of tissue that may be traversable, wherein multiple deformation, puncture, and insertion forces are required to reach the target location for the injection. Certain procedures such as an amniocentesis, for example, used in prenatal diagnosis of chromosomal abnormalities, fetal infections, or sex determination from a sample of amniotic fluid containing fetal tissues retrieved from the amniotic sac using a needle in the procedure, require passage through multiple layers of tissue to reach the target location. These procedures may include multiple phases and multiple forces which are experienced and which may be simulated in embodiments of the injection simulation member provided herein.

As used herein, the terms "subject", "user" and "patient" are used interchangeably. As used herein, the term "subject" refers to an animal, preferably a mammal such as a non-primate (e.g., cows, pigs, horses, cats, dogs, rats etc.) and a primate (e.g., monkey and human), and most preferably a human.

Turning to the Figures, FIG. 1 is a perspective view of an embodiment of the resettable injection training device 100 including an outer housing 110 and an inner housing 109 (shown in FIG. 2A-D). An injection simulation member 120 (see FIGS. 2A-D) extends from a distal end of the inner housing 109. The inner housing defines a channel for receiving a portion of a plunger 112. The device 100 further includes a rigid needle shield (RNS) 116 removably disposed over the injection simulation member as shown in FIG. 1 to receive an injection simulation member. The rigid needle shield 116 simulates a RNS of a drug delivery device, and protects the injection simulation member prior to use of the device 100. The device 100 further includes a safety shield 114 and a plunger 112. The plunger 112 includes a plunger contact portion 113 at its proximal end for contact by the user during an injection training. In some embodiments, the device 100 may also include a flange 118 allowing for a user to grip the device 100 during use. In one non-limiting embodiment, the flange 118 may be gripped with a user's index and middle fingers, and the user's thumb may press on the plunger contact portion 113 to move the plunger 112 toward the distal end of the device 100 during use.

FIGS. 2A-2D are cross sectional views of the resettable injection training device embodiment 100 shown in FIG. 1, demonstrating a step-by-step use of the device 100 during a simulation. FIG. 2A shows the device in the ready to use position, prior to actuation of the device 100. Prior to use of the device 100, the safety shield 114 is in a ready-to-fire position as shown in FIG. 2A, wherein it is maintained in this position by way of an interaction between a proximal portion 114a of the safety shield and one or more housing tabs 124 on a proximal portion of the outer housing 110 as seen in FIG. 2A. A housing biasing member 111 is disposed between the outer housing 110 and the safety shield 114 (in a pocket 115 defined in the outer housing wherein the biasing member interfaces with a flange 117 (see FIG. 2B) positioned at or near (e.g. within 2-15 mm) the proximal end of the safety shield 114) and is in a compressed position as shown in FIG. 2A. FIG. 2A also provides a view of the injection simulation member 120 extending from a distal end of the inner housing 109. An injection simulation biasing member 122 may also be included, wherein the injection simulation member 120 is movable against a resistance caused by of the injection simulation biasing member 122 upon a force on its distal end, to retract the injection simulation member and simulate an injection.

In FIG. 2A, in the ready to use position, the RNS 116 is shown as disposed over the injection simulation member 120. This RNS 116 is removed before use of the training device 100. The device embodiment 100 also includes a plunger 112 having a plunger contact portion 113. The plunger 112 is slidable within a channel 107 formed by the inner housing 109. To initiate an injection training, the plunger 112 is moved in a distal direction relative to the outer housing 110.

Once the plunger 112 is moved in a distal direction relative to the outer housing 110, as shown in FIG. 2B by pressing upon the plunger contact portion 113, to simulate delivery of medicament during an injection, the plunger contact portion 113 interfaces with the housing tabs 124 as shown in FIG. 2A to displace the tabs 124. Such displacement causes a release of the safety shield 114, allowing the safety shield 114 to slide in a proximal direction relative to the outer housing 110. The housing tabs 124 may include a flexible material in some embodiments or may deform upon contact by the plunger contact portion 113, in an embodiment. The deformation may be reversible following contact with the plunger contact portion 113 is removed, in one example.

Upon release of the housing tabs 124 from the proximal end of the safety shield 114a, the housing biasing member 111 is free to extend to an extended position as shown in FIG. 2C, moving the safety shield 114 in a proximal direction relative to the outer housing 110 under the force of the housing biasing member 111, in one example. In another example, upon release of the housing tabs 124 from the proximal end of the safety shield 114a, the outer housing 110 may extend in a distal direction relative to the safety shield 114. In another non-limiting embodiment, both the safety shield 114 and the outer housings 110 may extend away from each other. This movement allows the outer housing 110 to extend over the injection simulation member 120 or allows the injection simulation member 120 to retract within the outer housing 110, or both, in embodiments described herein, to prevent contact between the user and the injection simulation member 120, preventing contact with the injection simulation member 120 after use of the device 100.

As shown in FIG. 2C, once the device 100 has been used for a training, the outer housing 110 is in an extended, releasably locked position (alternatively, it may be said that the plunger and safety shield 112, 114 are in an extended releasably locked position relative to the outer housing 110, in any case, the plunger 112, safety shield 114, and inner housing 109 extend away from the outer housing 110, in non-limiting embodiments), and the injection simulation member 120 is disposed within the outer housing 110.

The outer housing 110 may include an outer housing projection 126 that may interface with a safety shield protrusion 128 when the outer housing 110 and safety shield 114 extend away from one another following a simulation with the device 100. The interface between the safety shield protrusion 128 and the outer housing projection 126 may prevent the safety shield 114 from releasing from the outer housing 110 when the safety shield 114 is extended away from the outer housing 110 as shown in FIG. 2C.

Reset of the device 100 occurs by resetting the plunger 112 (withdrawing the plunger 112) by moving it in a proximal direction as shown in FIG. 2D and moving the outer housing 110 proximally relative to the safety shield 114, against the force of the biasing member 111. This movement occurs until the housing tabs 124 reach the safety shield proximal end 114a. Further movement of the outer housing 110 relative to the safety shield 114 may occur until the outer housing tabs 124 interface with the protrusion 114a to maintain the device 100 in a reset position, wherein the biasing member 111 in a compressed position, and the device 100 is ready-to-fire. Reset can occur by handling the gripping tabs 134 on the safety shield 114 (shown in FIG. 7B) and moving the outer housing 110 proximally relative to the safety shield 114 until the device reaches the rest position shown in FIGS. 2A, and 4A-4B.

Figure 3D:
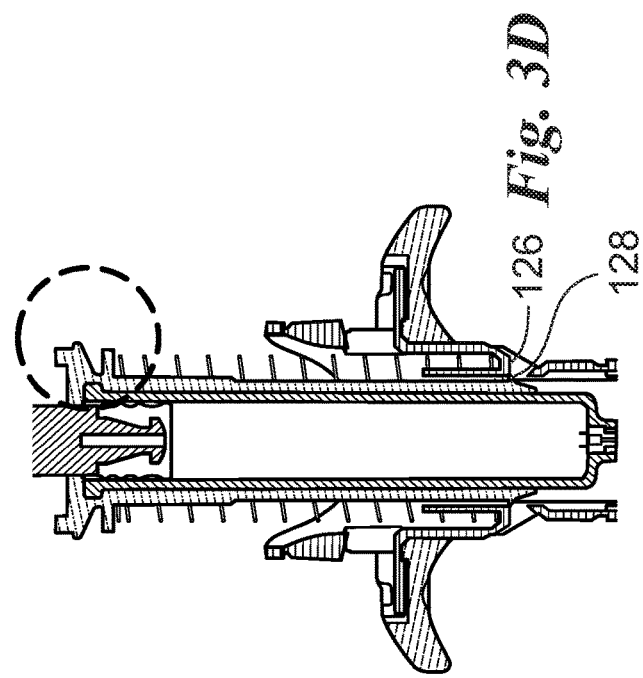
Figure 3A:
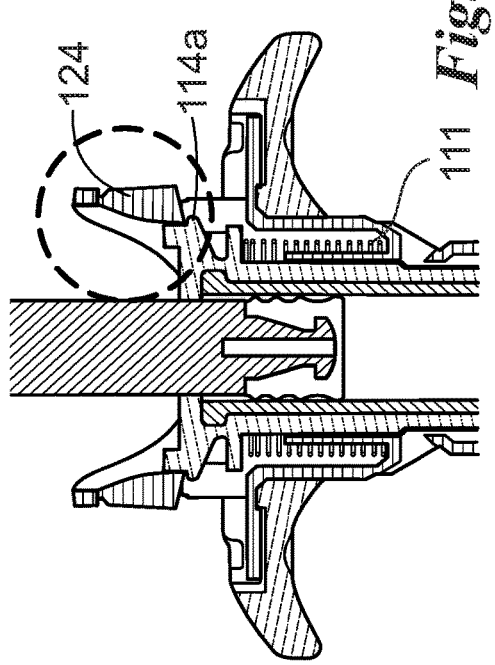

FIGS. 3A-D are partial cross-sectional views of the resettable injection training device 100, demonstrating step-by-step use of the device 100 from the ready to fire position, through reset of the device 100 in close-up views. FIG. 3A shows the housing tabs 124 interfacing with the proximal end of the safety shield 114a, maintaining the safety shield 114 in a ready-to-use position. Movement of the plunger 112 during use of the device 100 so as to simulate movement of a plunger 112 in a drug delivery device to deliver medicament occurs to actuate the device 100. The plunger 112 is moved in a distal direction until the plunger contact portion 113 interfaces with the housing tabs 124, as shown in FIG. 3B, to release the shield allowing it to deploy under the force of the biasing member 111. Deployment of the safety shield 114 causes it to separate from the outer housing 110 as shown in the FIGS provided herein. However, in another embodiment, movement of the plunger in a distal direction may cause the plunger contact surface 113 to interface with housing tabs 124 to release the outer housing 110, causing outer housing to extend relative to the safety shield 114 under the force of biasing member 111.

Figure 3C:
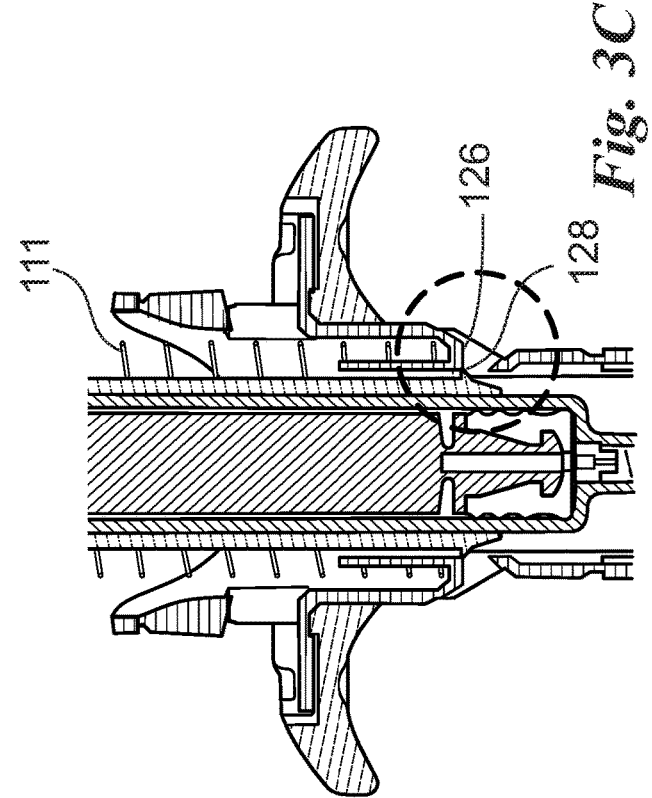

Extension of the biasing member 111 (biasing member 111 is shown in a compressed position in FIGS. 3A-3B, and in an extended position in FIGS. 3C-3D) causes the injection simulation member 120 to be withdrawn within the outer housing 110 (or causes the outer housing 110 to extend over the injection simulation member 120) as shown in FIG. 6B. As shown in FIG. 3C, at least a portion of the safety shield 114 maintains in contact with the outer housing 110 when in the extended position by way of an interaction between the safety shield protrusion 128 and the housing projection 126 until such time the device 100 is reset for a subsequent use. This interaction prevents the safety shield 114 and outer housing 110 components from disconnecting from one another during use of the device 100.

Proximal movement of the plunger 112 as shown in FIG. 3D (e.g., by withdrawing the plunger from the channel) is a first step in reset of the device 100 according to one embodiment, releasing the plunger contact portion 113 from the proximal end of the safety shield 114a. Movement of the plunger 112 as shown in FIG. 3D causes the plunger 112 to return to its reset position. A subsequent step in resetting the device 100 may include movement of the outer housing 110 in a proximal direction relative to the device 100, toward the safety shield 114, resulting in compressing the biasing member 111 until the housing tabs 124 reach the proximal end of the safety shield 114a. Once the housing tabs 124 are positioned proximal to the extruded portion at the proximal end of the safety shield 114a, the device 100 is reset for a subsequent use. Interaction between the housing tabs 124 and the safety shield proximal end 114a in this manner maintain the device in a ready-to-use position as shown in FIGS. 4A-4B. The device 100 may be actuated for a subsequent simulation (i.e., a ready-to-fire position).

Figure 5B:
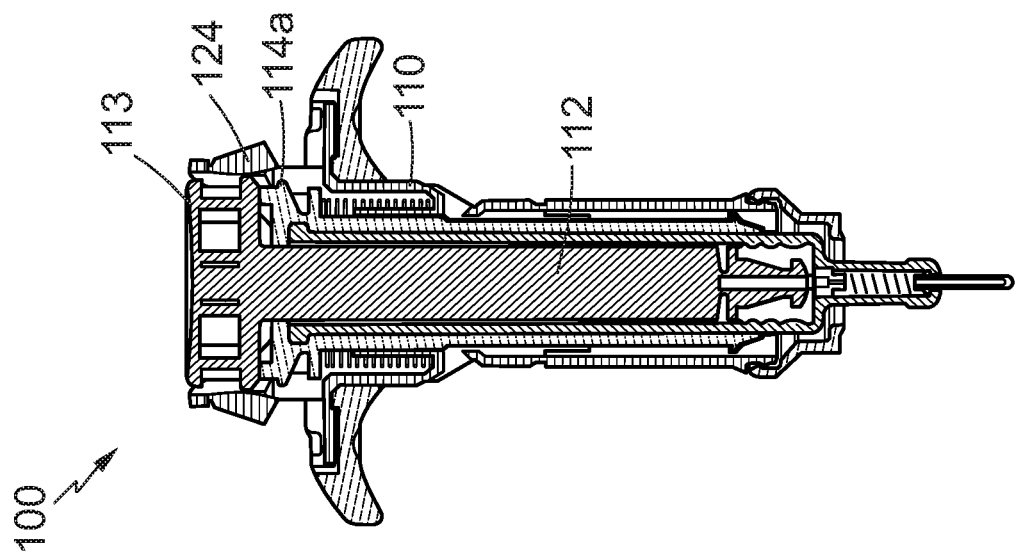
FIGS. 5A-5B is a partial cross-sectional view and a full cross-sectional view, respectively, of the device embodiment shown in FIG. 4A-B once a plunger embodiment has been moved relative to the device in a distal direction.
Figure 5A:
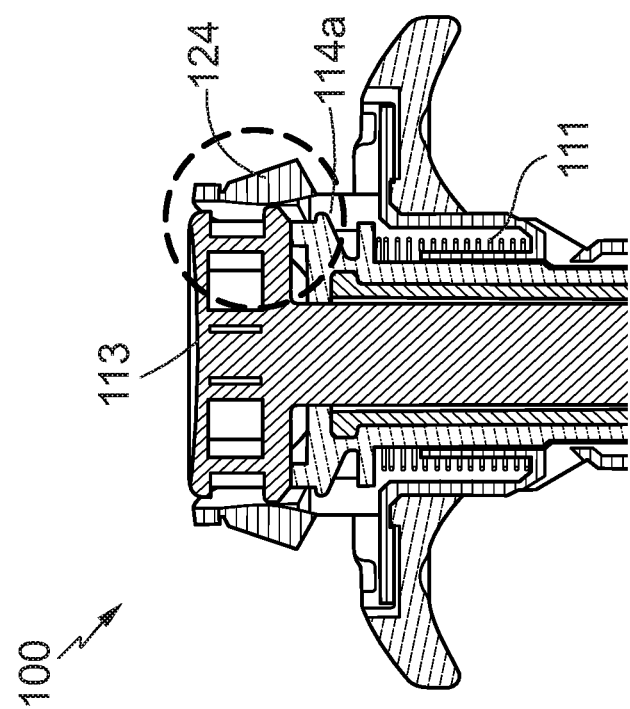

FIGS. 5A-5B is a partial cross-sectional view and a full cross-sectional view, respectively, of the device 100 embodiment once the plunger 112 has been moved relative to the device 100 in a distal direction to simulate the delivery of medicament in a drug delivery injection device. This distal movement of the plunger 112 allows the plunger contact portion 113 to deflect the housing tabs 124 at the proximal end of the outer housing 110, releasing the tabs 124 from the proximal end of the safety shield 114a. This release allows the biasing member 111 to extend, allowing the safety shield 114 to move in a proximal direction relative to the outer housing 110 (or, as mentioned herein, allowing the outer housing 110 to move in a distal direction relative to the safety shield 114, or allowing the outer housing 110 and safety shield 114 to move away from one another). A relationship between the safety shield 114 and the inner housing 109 causes the inner housing 109 to move in conjunction with the safety shield 114, in one embodiment, which may cause the injection simulation member 120 to be withdrawn or retracted into the outer housing 110 as shown in FIG. 6B. FIG. 6A shows the tabs 124 have returned to their pre-deflected positions, in the embodiment shown, due to the lack of interaction between the tabs 124 and the plunger contact portion 113. FIG. 6A also shows the interface between the safety shield protrusion 128 and the housing projection 126, maintaining the extended position of the safety shield 114 shown in FIG. 6B, until the device 100 is reset for a subsequent use.

Figure 7A:
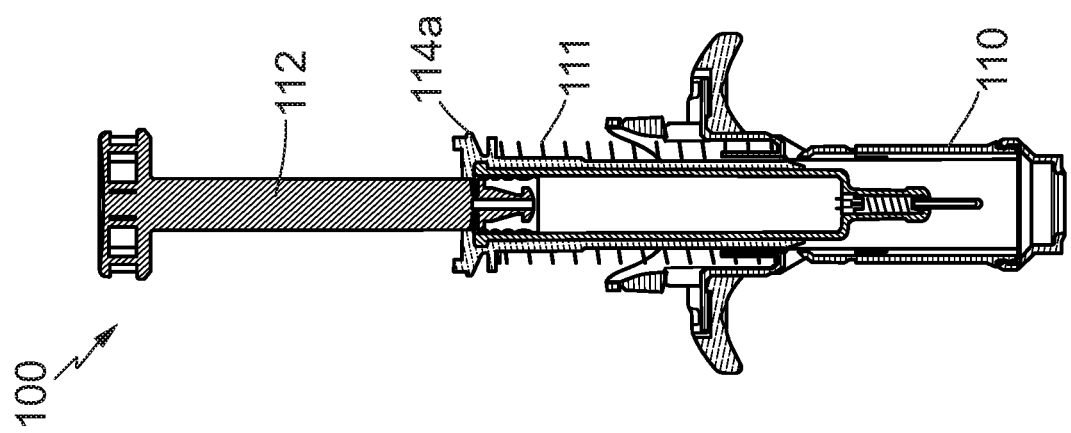
FIGS. 7A-7C is a partial cross-sectional view, a partial perspective view, and a full cross sectional view, of the device embodiment shown in FIGS. 6A-6B, during reset of the device.
Figure 7B:
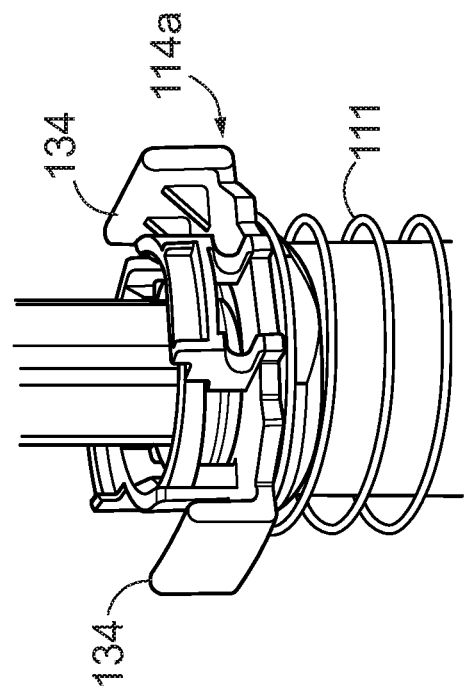
Figure 7C:
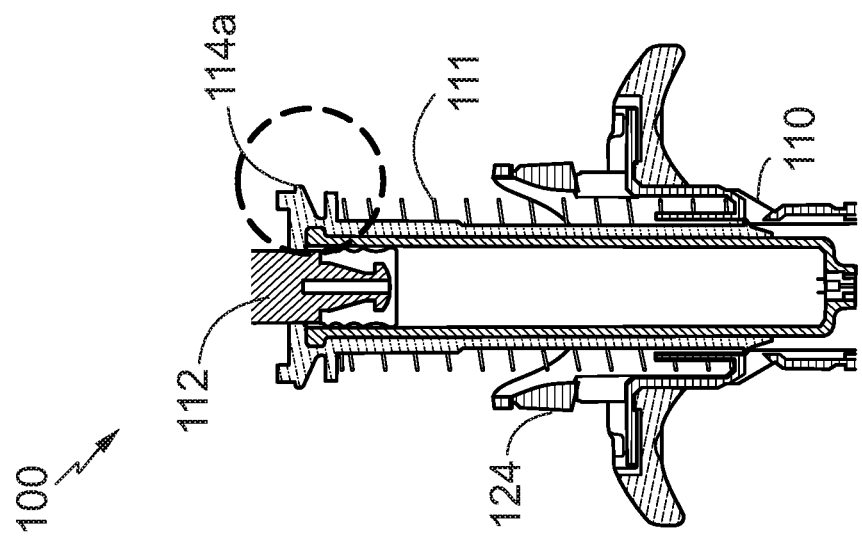

Reset, as aforementioned occurs by proximal movement of the plunger 112 as shown in FIG. 7A-7C, followed by movement of the outer housing 110 in a proximal direction relative to the safety shield 114, biasing the biasing member 111, until the housing tabs 124 come into contact with the safety shield proximal end 114a, such that they interface to maintain the safety shield 114 in a retracted position, temporarily locking the safety shield 114 in a ready-to-use position until a subsequent actuation of the training device 100. This actuation may occur by distal movement of the plunger 112 as previously described. The gripping tabs 134 shown in the zoomed in view of FIG. 7B allow a user to grip the safety shield 114 while moving the outer housing 110 proximally toward the safety shield 114, or, alternatively moving the safety shield 114 distally toward the outer housing 110, or a combination of both proximal movement of the outer housing 110 and distal movement of the safety shield 114, such that the outer housing 110 and safety shield 114 are moved toward one another to reset the device 100 until the device 100 reaches the reset position shown in FIG. 4B.

In a further embodiment, a method for using a resettable injection training device 100 is provided. The resettable injection training device 100 includes a releasable locking outer housing 110 (or may feature an outer housing 110 that does not lock). The outer housing 110 includes a proximal end 110a and a distal end 110b and locking tabs 124 at the proximal end of the outer housing 110a. The device 100 further includes an inner housing 109 and an injection simulation member 120 extending from a distal end of the inner housing 109. The device 100 further includes a slidable releasably locking safety shield 114 having a proximal end 114a and a distal end 114b, the safety shield 114 being slidable relative to the outer housing 110 between a ready-to-fire position, and a fired position, wherein when the safety shield 114 is in a fired position, the injection simulation member 120 is positioned at least partially within the outer housing 110. In another embodiment, the safety shield 114 may not lock.

The device 100 may further include a plunger 112 slidable relative to the inner housing 109, including a proximal end and a distal end, the proximal end comprising a plunger contact portion 113 for interfacing with the locking tabs 124 to displace or deflect the locking tabs 124 to release the safety shield 114. The device 100 further includes a biasing member 111. In one embodiment, the biasing member 111 is disposed between the outer housing 110 and the safety shield 114, said biasing member 111 causes the shield 114 to extend away from the outer housing 110 (or the outer housing 110 to extend away from the shield 114) until the device reaches a "fired" position upon release of the locking tabs 124. The method embodiment described herein may include distal movement of the plunger 114 to simulate delivery of a medicament in a drug delivery device, until a plunger contact portion 113 interfaces with and displaces one or more housing tabs 124 from the proximal end of the safety shield 114a. This movement is followed by extension of the biasing member 111, causing the safety shield 114 to move in a proximal direction relative to the outer housing 110, in one embodiment, such that the injection simulation member 120 is positioned within the outer housing 110.

In yet another embodiment, a method for resetting a resettable injection training device 100 is provided, including moving the plunger 112 in a proximal direction, followed by proximal movement of the outer housing 110 against the force of the biasing member 111 (or distal movement of the safety shield 114 toward the outer housing 110, or movement of the outer housing 110 and safety shield 114 toward one another) until the locking tabs 124 interface with the proximal end of the safety shield 114a to lock the safety shield 114 in a ready-to-fire position. The operation described resets the device 100 in preparation for a subsequent use.

While a number of embodiments of the present invention have been shown and described herein in the present context, such embodiments are provided by way of example only, and not of limitation. Numerous variations, changes and substitutions will occur to those of skill in the art without materially departing from the invention herein. For example, the present invention need not be limited to best mode disclosed herein, since other applications can equally benefit from the teachings of the present invention. Also, in the claims, means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

What is claimed is:

1. A resettable injection training device comprising:
   an outer housing comprising a proximal end and a distal end, said proximal end comprising one or more locking tabs;
   an inner housing forming a channel;
   an injection simulation member extending from a distal end of the device;
   a safety shield having a proximal end and a distal end, the safety shield being movable relative to the outer housing between a ready-to-fire position, and a fired position, wherein when the safety shield is in a fired position, the injection simulation member is positioned within the outer housing;
   a plunger slidable relative to the inner housing, the plunger comprising a proximal end and a distal end, and a plunger contact portion at its proximal end; and;
   wherein the device is reset by releasing the interface between the plunger contact portion and the safety shield, and movement of either of the outer housing toward the safety shield, or the safety shield toward the outer housing, or both, until the housing locking tabs interface with the proximal end of the safety shield to maintain the device in a reset position.

2. The resettable injection training device of claim 1, wherein the outer housing locking tabs comprise a flexible material.

3. The resettable injection training device of claim 1, wherein the outer housing locking tabs interface with a proximal end of the safety shield to maintain the device in a pre-use position, or a reset position.

4. The resettable injection training device of claim 1, wherein the safety shield is slidable relative to the outer housing.

5. The resettable injection training device of claim 1, wherein the safety shield further comprises one or more protrusions on a proximal end thereof, such that the outer housing locking tabs abut the one or more protrusions on the safety shield, to maintain the safety shield in a pre-use or reset position until actuation of the device.

6. The resettable injection training device of claim 1, further comprising a biasing member disposed between the outer housing and the safety shield, said biasing member extends the shield in a proximal direction upon release of the interface between the locking tabs and the safety shield.

7. The resettable injection training device of claim 1, further comprising a biasing member disposed between the outer housing and the safety shield, said biasing member extends the outer housing in a distal direction upon release of interface between the locking tabs and the safety shield.

8. The resettable injection training device of claim 1, wherein an interface between the plunger contact portion and the one or more locking tabs releases the safety shield.

9. The resettable injection training device of claim 8, wherein upon release, the safety shield extends in a proximal direction.

10. The resettable injection training device of claim 1, further comprising a removable rigid needle shield (RNS) disposable over the injection simulation member.

11. The resettable injection training device of claim 1, wherein the inner housing is engaged with the safety shield.

12. A method for using a resettable injection training device, comprising:
   the device of claim 1, wherein the plunger is in a retracted position;
   moving the plunger toward a distal end of the device to simulate medicament delivery, until a plunger contact portion interfaces with and displaces one or more housing tabs from the proximal end of the safety shield, releasing the safety shield, such that the outer housing extends over the injection simulation member, wherein said device is in a fired position.

13. The method of claim 12, further comprising a biasing member, said biasing member extends to move the safety shield in a proximal direction relative to the outer housing.

14. The method of claim 12, further comprising a rigid needle shield (RNS) disposed over the injection simulation member, wherein before moving the plunger toward the distal end of the device, the RNS is removed to expose the injection simulation member.

15. A method for resetting a resettable injection training device, comprising:
   the device of claim 1, wherein the device is in a fired position, comprising:
   moving the plunger in a proximal direction relative to the outer housing;
   moving the outer housing in a proximal direction relative to the safety shield until the locking tabs of the outer housing engage the proximal end of the safety shield to maintain the device in a ready-to fire position for a subsequent use.

16. The method of claim 15, wherein the device further comprises a biasing member disposed between the safety shield and the outer housing, wherein movement of the outer housing in a proximal direction to reset the device, requires movement against the force of the biasing member to compress the biasing member during reset.

* * * * *